M. Smith.

Casting Refractory Metals.

No. 3,449 Reissued May 18, 1869.

Witnesses
Geo. F. Smith
P. P. Olf Smith

Inventor
Michael Smith
By Knight Bros
Attys

UNITED STATES PATENT OFFICE.

MICHAEL SMITH, OF SOMERVILLE, ASSIGNOR TO METALLIC COMPRESSION CASTING COMPANY, OF BOSTON, MASSACHUSETTS.

IMPROVEMENT IN APPARATUS FOR CASTING REFRACTORY METALS.

Specification forming part of Letters Patent No. 70,038, dated October 22, 1867; Reissue No. 3,449, dated May 18, 1869.

*To all whom it may concern:*

Be it known that I, MICHAEL SMITH, of Somerville, in the county of Middlesex and State of Massachusetts, and formerly of the city and county of Philadelphia, State of Pennsylvania, have invented a new and useful Improvement in Casting Refractory Metals; and I do hereby declare the following to be a clear and exact description thereof, reference being had to the accompanying drawings, which are made part of this specification.

My invention has for its objects the casting of brass, bronze, and others of the refractory metals and metal compositions with a high degree of density and freedom from blow-holes; and the greatest of its novelties consists in producing perfect, sharp, and well-defined fac-similes of the pattern, and relates to that class of devices which for the above objects employ mechanical pressure on the fluid metal during the act of introducing the metal into the molds, and keeping the pressure on the metal until it is solidified. I am thus enabled to use molds of great density and of such material as could not be used in the ordinary way of casting and pouring the metal.

Figure 1:
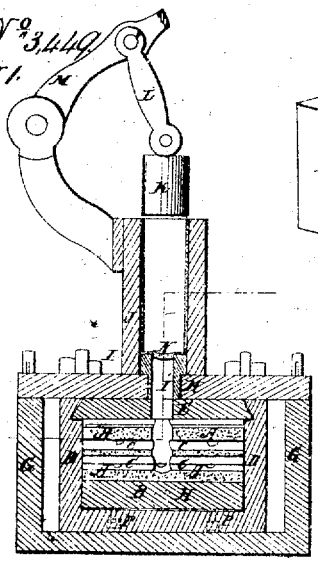
Figure 3:
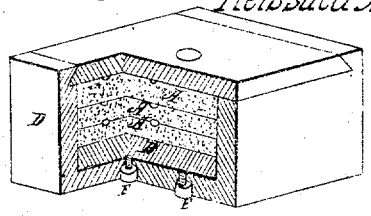
Figure 4:
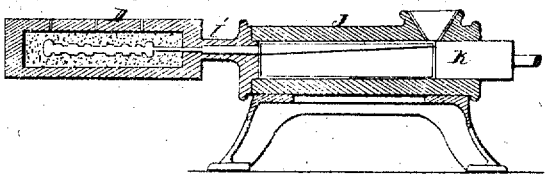
Figure 5:
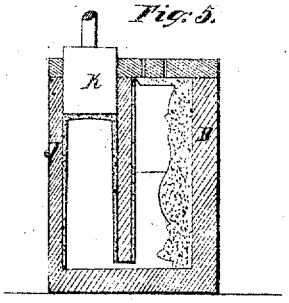
Figure 2:
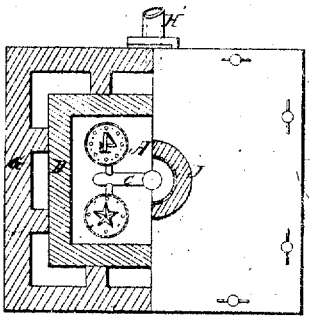
Figure 6:
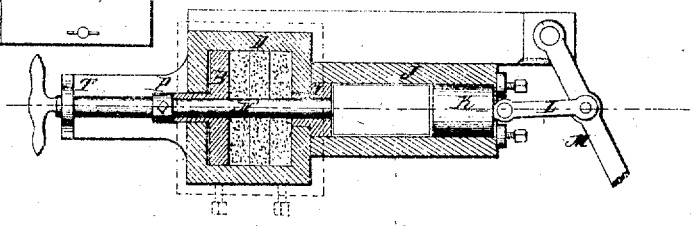
Figure 7:
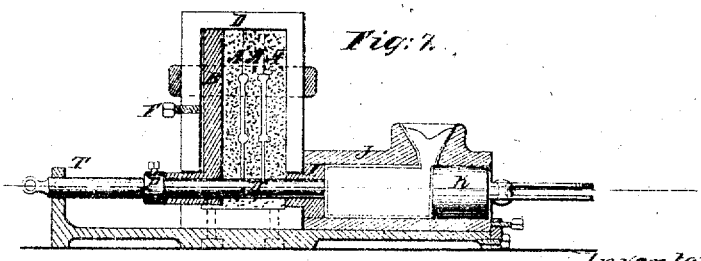

In the drawings, Figure 1 is a vertical section of an apparatus embodying my invention. Fig. 2 is a partially-sectionalized top view thereof. Fig. 3 is a partially-sectionalized view of my nest or series of molds. Figs. 4 and 5 show modifications and different styles or types adapted to certain kinds of casting. Figs. 6 and 7 represent a style of apparatus in which the molds are held in a vertical position, admitting the metal at the lower end of the mold. This style has proved in practical use to be best adapted to all kinds of smaller castings and where it is desirable to cast a great number at one operation.

Similar letters of reference indicate corresponding parts of the several figures.

The invention may be applied to one or a number of molds; but I have selected for illustration a series or nest of molds, A A A A, Figs. 1, 3, 6, and 7, formed of baked clay, made in the manner described in the Letters Patent granted J. J. C. Smith, No. 85,340, the 29th of December, 1868, and more particularly, fully, and correctly set forth in his specification filed with his application for reissue of said patent. A good material for the said molds is potter's clay, which, being dried, finely ground, and then moistened sufficiently for molding, is mixed with sand and placed in a strong flask or casing, together with suitable patterns of metal or other material and of any required shape, the face of which patterns may be prepared by oiling and afterward coated with a clay slush. A heavy pressure is then applied gradually to the patterns and clay within the casing, the pressure reaching three hundred or four hundred pounds to the square inch. When the pressure has been continued for a sufficient time for the pattern to set and for the surplus water in the slush coating to be absorbed by the more dry parts of the clay the molds may be taken out and dried and baked ready for use These molds are adapted to be stacked or piled one above the other and supported on an iron slab, B, as represented in Figs. 1 and 3, or they may be put together one after the other, as shown in Figs. 6 and 7. Orifices or gates C *c*, provided in said molds, afford in their collective capacity gates or sprues for the admission of the molten metal from the injecting apparatus, to be presently described. Said molds and slab B are confined in a strong iron box, D′, whose sides may be provided with small suitable chinks or orifices for the escape of air and gas during the act of casting. An aperture, E, in the top of the box D, (seen in Fig. 1,) or at the lower end of box D, as in Fig. 7, in continuation of main gate C, serves to admit the metal thereto. Set-screws F, tapped through the bottom of said box D, Fig. 1, or through the back side of the box D, Fig. 7, and bearing against the under side of the iron slab B or the back side of the iron slab B, as shown in Fig. 7, serve to press and hold the molds firmly together and against the top of box D, Fig. 1, or against the front of the box D, as seen in Fig. 7. It is necessary to hold the molds firmly together, so that they may resist the pressure of the metal when injected, so that the partial parting or opening of the molds is prevented in order to avoid the formation of a seam at the place where the molds are jointed.

The continued application of my apparatus in actual practice has proved that it is not really necessary to inclose the box D in an air-tight chest G. A perfect, sharp, and well-defined casting may be produced if the air-tight chest G is dispensed with; but in cases where it is of great importance to have a solid casting free from blow-holes throughout the whole body of the casting, it is a great assistance to inclose the box D in the air-tight chest G, and by means of the pipe H and a somewhat large air-suction pump the air is exhausted from the molds and space between the boxes D and G shortly before or during the act of casting or injecting the metal. Care must be taken that the joints of the chest G are well closed, and the junction between the injecting-vessel and chest G are luted up with wet clay to make all air-tight. The perforation E in box D receives a tube or thimble, I, whose central orifice forms the channel of communication for the fluid metal between the injecting-vessel and the molds, and is closed with a movable plug or tamp, N. The injecting cylinder or vessel J may be easily slipped off of the thimble I when the metal has become set after the casting operation. The purpose of said thimble is to obviate the difficulty of detaching the cylinder from a superincumbent head of metal, which difficulty would exist in case of the formation of a shoulder upon said cylinder at the end or point of discharge into the molds. If said thimble is made of iron or other metal, it ought to be divided longitudinally into two parts, so that the same may be readily detached from the metal in the central gate and the head left in the cylinder after casting. Continued practice has proved that the best manner of making said thimble is to form or make it by pressing moist clay into a suitable mold, after forming to burn it hard in the manner brick or pottery is burned, and to use a new thimble at every operation of casting. Such mineral thimbles are strong enough, cheaply made, and easily detached by breaking them in pieces after casting.

Fitting snugly around and extending upward from the thimble I is a tube or cylinder, J, as it is shown in Fig. 1. In Figs. 7 and 6 the cylinder rests on a platform, and extends horizontally from the thimble. To this cylinder is loosely fitted a plunger or piston, K, which is linked at L to a lever, M, by means of which the operator is enabled to lift the plunger clear out of the cylinder, so that it may be filled with molten metal, or press the piston downward into the cylinder and exercise the required pressure on the metal. The cylinder is made of a capacity fully exceeding that of the molds, so as to leave a good head of metal within the cylinder after the molds have been filled by the pressure exercised on the fluid metal. If the style of machine is used as shown in Figs. 6 and 7, where the cylinder is in a horizontal position, the same is provided with a funnel for the admission of the metal on the end where the plunger rests.

Having thus described the several parts of my apparatus, I will describe the manner of its use and operation, as near as it may be done without too great prolixity.

As in all other mechanical operations, continued practice is a first-class teacher. The first thing after the apparatus is obtained is to have suitable molds of such nature as to be readily made and of a material which will take a fine and sharp impression of the pattern, and at the same time of sufficient strength and density to resist the pressure of the metal when injected. The most suitable material for molds for brass, bronze, and compositions where only a limited number of castings are wanted of one pattern is fine potter's clay of such nature as to resist a somewhat high degree of heat without glazing. A description of the manner in which such molds are made is found in the patent of John Jos. Chas. Smith, No. 85,340, dated December 29, 1868, and a more full and accurate description thereof, as ascertained by actual practice, is contained in a recent application for a reissue of said patent. For some kinds of casting, especially in iron and steel, molds of iron and steel may be used with good success; but it is very essential that such metal molds be so arranged that the fluid iron or steel is injected as directly as possible, and without first passing through too long a space of gates or sprues before the mold is reached by the metal. The reason why this should be done is this: If fluid refractory metals come in direct contact with other metal surfaces, they chill and set more suddenly than those who are not acquainted with this property have any idea of, even if those surfaces shall have been previously made red-hot. The consequence of this action is that the casting will show streaks and an uneven surface; but if the molds are filled directly from the injecting-cylinder (avoiding the passing of the fluid metal over a long distance in the gates) and the strong pressure is brought to bear on the metal in the filled mold instantaneously before it has had time to form a hard skin or surface, a very good and sharp impression of the mold is thus obtained. Iron and steel molds used in this manner ought to be oxidized or rusted on the surface to a certain extent. These rusted or oxidized surfaces are somewhat non-conductive, and serve also to prevent the adhering of the injected metal to the molds. When the suitable molds are made, they are put in the box D. The iron slab or follower B is made to press and hold the molds firmly together by means of the set-screws F, tapped through the bottom or rear of the box D, just as the style of the machine may be, so as to resist the pressure of the injected metal without parting at the joints. Be it also remarked that the box D must be strong in accordance to its size. When this is done, the cylinder or injecting-vessel J is provided on the inside with a non-conducting lining, for the purposes hereinafter described.

The manner in which the lining of the cylinder is performed is this: Take some fine fireproof clay or kaolin free from sand or grit, and thoroughly blend the same with about one-half of good plumbago; then mix with water, so as to form a paste. The cylinder is heated to about 200° Fahrenheit, and with a brush the aforesaid paste is applied on the inside of the cylinder to a uniform thickness of about one-eighth of an inch, the heat of the iron cylinder drying the paste as applied. This done, the cylinder is heated more to evaporate all moisture from the lining, and is ready for further operation. If the style of machine is used, as shown in Fig. 7, the piston K is fastened during the operation of coating, and coated also on the surface coming in contact with the fluid metal. This lining of the cylinder serves several useful purposes. It serves to pack the space or joint between the cylinder and piston and prevents the intrusion of the metal between the two, which intrusion would certainly and rapidly clog these parts and stop the operation, as the heat of the fluid metal will at once expand the cylinder more than the piston and admit the metal between the joint. It should be explained that the plunger or piston K fits the cylinder, and is therefore larger than the internal diameter of the lining, and that at every operation the cylinder must be relined or recoated, as such lining is detached from the cylinder J and pushed in advance of the piston K at every forward movement of the latter, the effect of which is to close the joint and prevent the intrusion of the metal between the piston and side of the cylinder, as above stated. No matter how high the pressure is on the fluid metal not a drop can leak out. The detached lining will pack the joint so much the more closely. The importance of this detachable lining can scarcely be overestimated, since it forms by its non-conducting property the only practicable means for preventing the chilling or rapid setting and also the adhering of the molten metal, which would arrest the forward motion of the piston and preclude any successful operation. Those acquainted with the nature of refractory metals know how rapidly they chill and set if they come in contact with other metal surfaces, even if said surface is made red-hot, and it requires several minutes time to fill the cylinder and perform the operation of injecting. This lining serves also to prevent the direct contact of the fluid metal with the surface of the cylinder, which would soon spoil the cylinder by the excessive heat of a mass of molten metal, even if the other aforesaid advantages were not of such great importance. When the lining and drying of the cylinder are performed, I take the thimble I, close its orifice with a plug or tamp, N, (made also of burned clay,) in such a manner that the plug will yield or move at a pressure of about six or eight pounds to the square inch. When this is done, the thimble is used to close the open end of the cylinder, resting on a shoulder or offset on the inside near the end of cylinder. The other end of the thimble is set in the perforation H on top of box D, so that the main orifice or gate in the molds forms the continuation of the orifice plugged up in the thimble. This done, the cylinder is fastened to the box D by means of screws or otherwise, and is ready to receive the molten metal. The metal is poured in, if the machine is of the style represented in Figs. 1, 2, and 3, at the open end or top, and if of the type as seen in Figs. 6 and 7, at the funnel connected with the cylinder. As soon as the cylinder is filled, pressure is at once applied on the fluid metal, and is continued until the molds are filled and the metal is well set. A pressure from thirty to sixty pounds to the square inch, and sometimes more, is to be applied to the metal; but experience and a little practice will soon show how much pressure is required for certain kinds of casting.

The office of the plug or tamp N in the thimble I is to prevent the gradual passage of the metal from the cylinder into the molds. If pressure is applied on the metal, the plug will yield and pass along in the main gate, giving the metal free passage into the molds. When the casting is performed and the metal is set, the cylinder is readily detached by breaking the metal in the gate at the junction of the thimble and the molds. This ought to be done right after the casting is done and before the gate has acquired its full strength by cooling off. The remaining head of metal in the cylinder is easily removed after cooling. I have selected to illustrate my invention the preferred style or type thereof; but I do not propose to restrict myself thereto so long as the same results are obtained by means substantially equivalent. For an example, the pressure of steam or condensed air may be applied to act on the piston, or even the direct pressure of the steam or condensed air may be used to exercise direct pressure on the fluid metal, if the cylinder is in a vertical position and the end of the cylinder closed, although practical experience has proved to me that the mechanical pressure is the most reliable and least complicated.

I may also in some instances employ such modifications as are shown in Figs. 4 and 5, and in which corresponding parts are indicated by the same letters of reference. Said styles may be more adapted for heavy castings. In such machines the plug may be dispensed with; but this is not advisable. This style is a more simplified form, involving few parts in its construction, more calculated for a single piece of casting at one operation.

In the apparatus shown in Fig. 6 and 7 in horizontal and vertical sections, and where corresponding parts are also indicated by the same letters of reference as in Figs. 1, 2, and 3, the differences are the introduction of a sliding rod, N, for temporarily closing communication between the cylinder J and molds A, and the abandonment of the air-tight chest G. This sliding rod may be used as a substitute for the plug N, its function being the same—that is to say, to retard the gradual passage of the metal into the molds until pressure is applied. When pressure is applied to the metal in the cylinder, the rod N will be forced back by the metal, so as to open communication between the cylinder and the molds. The extent of motion of the rod N may be regulated by means of an adjustable collar, P, which arrests the rod by coming in contact with an abutment, T; but experience obtained by continued practice has proved to me that the clay plug or tamp is the most reliable and least complicated of the two.

In order to have the utility of my apparatus fully appreciated, I shall give a few words of explanation. Practical founders know that if a mold could be used out of a material more dense than sand—as sand loam—a more perfect and sharp mold could be made, and there would not be so great liability of the sharp lines of the mold being washed by the inflowing metal; but they are also aware that if a mold is made too dense by ramming and stamping or by the use of dense material the gases generated and the air in the molds will not be ejected by the mere pressure obtained by the weight of the metal itself. The consequence is that the metal is blown out of the mold and the casting is useless; but by the application of my casting apparatus I am enabled to use molds of great density and of material taking a very fine and sharp impression of the patterns by great pressure applied to the material formed into molds. By providing separate injecting-vessels for the reception of the molten metal previous to its introduction into the mold, and having a high pressure to bear on the fluid metal in the very act of its rapidly filling of the mold, the elimination of the gases generated and the air in the mold is compelled to take place through very fine pores and small orifices made at the joints of the molds, and as the pressure is kept on the metal until it is well set or solid, such a thing as blowing will never or very seldom take place; but the metal is compelled to fill every cavity of the mold, producing a perfect, sharply-defined, and smooth surface.

In cases where it is of great importance to have very solid casting the application of the air-tight chest G, provided with an air-exhaust or suction pump, is of great assistance, as it facilitates the escape of the gases generated. A good and solid casting is obtained, also, by the apparatus shown in Figs. 6 and 7, because the metal enters the mold at the bottom and rises up.

Novelty is not claimed in the special means employed for applying power to the piston or follower. It is immaterial whether this is done by a lever or screw or by the pressure of air or steam. These various means and modes of operation are referred to not as involving distinct invention, but as mechanical equivalents of each other, in order that those parts of the invention which are new may be used to the best advantage under varying circumstances.

Having thus described my invention, what I claim as new, and desire to secure by Letters Patent, is—

1. The provision of and combination with one or a series of molds for casting metal, of a separate injecting vessel or cylinder, J, said cylinder being provided with a piston or plunger, K, and an internal non-conducting lining made of clay and plumbago or other non-conducting material equivalent thereto, said lining to be detached and used in the manner and for the purpose described.

2. The provision on said cylinder J of a temporarily-closable but self-opening communication with the molds, as and for the purpose set forth.

3. The combination of the mold-box D, detachable thimble I, injecting-vessel J, and plunger K, all constructed, arranged, and operating in the manner and for the purposes explained.

4. The arrangement of a series of molds having consecutive orifices or gates, a slab or follower, B, and set-screw F, and inclosed in a box, D, as and for the purpose set forth.

5. The subjects of clause last recited when inclosed in an air-tight chest, G, having connections with an air-exhaust, for the purpose specified.

MICHAEL SMITH,
METALLIC COMPRESSION CASTING CO.
By J. J. CH. SMITH,
*President.*

Witnesses:
JOHN STEPP,
F. H. KINGSBURY.